UNITED STATES PATENT OFFICE.

FRANK J. BAUMGARDNER, OF CLEVELAND, OHIO, ASSIGNOR OF FOUR-TENTHS TO WORTHINGTON HOYT AND ONE-TENTH TO ARTHUR J. HUDSON, BOTH OF CLEVELAND, OHIO.

PRINTING-INK AND THE LIKE.

1,234,264.       Specification of Letters Patent.       Patented July 24, 1917.

No Drawing.      Application filed April 29, 1916.   Serial No. 94,393.

*To all whom it may concern:*

Be it known that I, FRANK J. BAUMGARDNER, a citizen of the United States, residing at Cleveland, in the county of Cuyahoga and State of Ohio, have invented a certain new and useful Improvement in Printing-Inks and the like, of which the following is a full, clear, and exact description.

This invention relates to a composition of matter for use as an ink, more particularly printing ink, and under certain conditions the composition may be used as an extender for inks.

Generally speaking, the invention comprises the substances and combinations thereof set forth in the accompanying claims.

Printing inks as at present made may be described as containing a base which is usually aluminum hydrate, a varnish which may be a linseed oil varnish or a rosin varnish, a drier, and a color material to impart the desired color to the ink. Sometimes other materials may be added to impart some desired characteristic to the ink but the essential substances of an ink are as stated above.

I have discovered that oyster shells when finely ground may be used as a base for printing inks, displacing the aluminum hydrate, not only without losing any of the desirable qualities in an ink but gaining certain advantages. First, ink with an oyster shell base will readily dry after impression upon paper or other material without a drier material as such being added to the ink. That is to say, the shell has in itself properties of a drier. In the second place, a printing ink with an oyster shell base prints sharp, that is, it prints clean without giving a clouded or rubbed appearance when an impression is taken. This is a feature particularly noticeable with this composition.

I prepare a printing ink as follows: The oyster shell is ground very fine, substantially to go through a sieve of one hundred and fifty to two hundred mesh screen. In this condition the material is very light and bulky. The ground shell is mixed with a suitable amount of a varnish and is then passed one or more times through an ink mill. The varnish used may be a linseed oil varnish or a rosin varnish, in fact, any varnish or equivalent thereof which is at present used in ink making, may be used. The proportion of shell and varnish may vary with inks for different kinds of printing and I do not limit myself as to proportions.

The desirable color may be imparted by adding suitable coloring material such as furnished by anilin dyes or any other source, such as are now in use for similar purposes.

There may be inks used for some purposes which would require a drier to be added. Such driers are well known as Japan drier, turpentine, litharge, and others.

Furthermore, I may add other materials to the ink for the purpose of imparting any desired characteristic to the ink. For instance, magnesium carbonate may be added to impart bulk to the ink.

Ground oyster shell when used as a base for ink, I have found requires less coloring material per unit weight or shell to produce a given depth of color than is required when hydrate of aluminum is used as a base.

Because of this property in the ground oyster shell, I may utilize pulverized oyster shells ground in varnish for the purpose of adding to inks which are made with a base of aluminum hydrate, or other material of similar characteristic for the purpose of extending the ink. The addition of the oyster shell and varnish within limits will increase the quantity of ink without affecting the color or the printing properties of the ink. In fact, the oyster shell and varnish thus added will make the ink print sharper and without cloudiness. This shell ground in varnish, as just stated, may be made and sold as an article of commerce for use as an extender with printing inks, and to this oyster shell and varnish other materials may be added to impart desired characteristics, as for instance, magnesium carbonate may be added to increase the bulkiness of the ink, or drier may be added if it is desired. The amount of this extender which may be used in connection with an ink will vary, the deeper colors of inks permitting more extender to be used than the lighter colors.

I have found that oyster shells give the best result when compared with other similar shells, but I consider it within the province of my invention to use oyster shells, clam shells, or other shells which are by nature similar to oyster shells, or any product which in its composition has substantially the composition of oyster shells.

In making up a printing ink, instead of first mixing the pulverized oyster shell with the varnish, as before stated, I may proceed to first mix the pulverized shell with the coloring material to produce what is known as a "color" and then mix and grind the "color" with varnish.

In fact, I may utilize the pulverized shell as a basis for making "colors" that may be made and sold as an article of commerce to be used in making printing ink and similar products.

Having thus described my invention, what I claim is:—

1. A printing ink comprising a base of ground oyster shells, a varnish and coloring material.

2. A printing ink comprising as a base substances substantially the same as found in oyster shells in finely ground condition, a varnish and coloring material.

3. A printing ink extender comprising finely ground oyster shells mixed with a varnish.

4. A printing ink extender comprising substances substantially the same as found in oyster shells in finely divided condition, mixed with a varnish.

5. A printing ink having a base of finely ground oyster shells.

In testimony whereof, I hereunto affix my signature.

FRANK J. BAUMGARDNER.